United States Patent
Van Himme et al.

(10) Patent No.: US 9,677,558 B2
(45) Date of Patent: Jun. 13, 2017

(54) METHOD FOR DETECTING A CLOSING TIME POINT OF A VALVE HAVING A COIL DRIVE, AND VALVE

(75) Inventors: Luc Van Himme, Laarne (BE); Koen Vermolen, Boechout (BE); Rudi Meekers, Zemst (BE)

(73) Assignee: CONTINENTAL AUTOMOTIVE GMBH, Hanover (DE)

( * ) Notice: Subject to any disclaimer, the term of this patent is extended or adjusted under 35 U.S.C. 154(b) by 199 days.

(21) Appl. No.: 14/123,477

(22) PCT Filed: May 29, 2012

(86) PCT No.: PCT/EP2012/059990
§ 371 (c)(1),
(2), (4) Date: Dec. 2, 2013

(87) PCT Pub. No.: WO2012/163892
PCT Pub. Date: Dec. 6, 2012

(65) Prior Publication Data
US 2014/0103243 A1  Apr. 17, 2014

(30) Foreign Application Priority Data

May 31, 2011 (DE) .................. 10 2011 076 784

(51) Int. Cl.
*F16K 31/06* (2006.01)
*F04B 53/10* (2006.01)
(Continued)

(52) U.S. Cl.
CPC ........... *F04B 53/10* (2013.01); *F02M 59/366* (2013.01); *F02M 59/367* (2013.01);
(Continued)

(58) Field of Classification Search
CPC ............... F16K 27/029; F16K 31/0655; F16K 31/0696; F16K 31/10
(Continued)

(56) References Cited

U.S. PATENT DOCUMENTS

| 1,210,871 A | 1/1917 | Suffa ........................... 123/90.35 |
| 2,744,467 A | 5/1956 | Eugene ......................... 417/520 |

(Continued)

FOREIGN PATENT DOCUMENTS

| CN | 101910636 A | 12/2010 | ............. F02M 59/02 |
| DE | 1550416 B1 | 4/1970 | ........... F16K 31/524 |

(Continued)

OTHER PUBLICATIONS

International Search Report and Written Opinion, Application No. PCT/EP2012/059990, 16 pages, Jul. 10, 2013.
(Continued)

*Primary Examiner* — Matthew W Jellett
(74) *Attorney, Agent, or Firm* — Slayden Grubert Beard PLLC

(57) ABSTRACT

An inlet valve for a fluid pump includes a movably supported tappet for closing a fluid inlet opening and an actuator for moving the tappet, wherein the actuator and the tappet are formed separately from each other and can be coupled to one another by a coupling element for transmitting an actuator driving force to the tappet. An assembly method for such an inlet valve is also disclosed.

13 Claims, 17 Drawing Sheets

(51) Int. Cl.
 *F04B 7/00* (2006.01)
 *F02M 59/36* (2006.01)
 *F02M 59/48* (2006.01)

(52) U.S. Cl.
 CPC ............ *F02M 59/48* (2013.01); *F04B 7/0076* (2013.01); *F04B 53/1022* (2013.01); *F16K 31/0655* (2013.01); *F02M 59/368* (2013.01); *F02M 2200/02* (2013.01); *Y10T 29/49412* (2015.01)

(58) Field of Classification Search
 USPC ................... 251/129.15, 129.19, 129.02
 See application file for complete search history.

(56) References Cited

U.S. PATENT DOCUMENTS

| | | | | |
|---|---|---|---|---|
| 3,459,363 | A | 8/1969 | Miller | 417/446 |
| 5,197,438 | A | 3/1993 | Kumano et al. | 123/506 |
| 5,252,816 | A | 10/1993 | Onimaru et al. | 235/462.36 |
| 5,957,674 | A | 9/1999 | Zenmei et al. | 417/505 |
| 6,659,421 | B1 * | 12/2003 | Goossens | B60T 8/363 |
| | | | | 251/129.02 |
| 6,824,120 | B2 * | 11/2004 | Furuta et al. | 251/355 |
| 7,036,788 | B1 * | 5/2006 | Schneider | G05D 16/2013 |
| | | | | 251/122 |
| 7,857,282 | B2 * | 12/2010 | Goossens | B60T 8/363 |
| | | | | 251/129.02 |
| 8,287,256 | B2 | 10/2012 | Shafer et al. | 417/505 |
| 2003/0107015 | A1 | 6/2003 | Mianzo et al. | 251/129.04 |
| 2008/0279705 | A1 | 11/2008 | Wago et al. | 417/437 |
| 2009/0267009 | A1 * | 10/2009 | Hofmann | F16K 31/0689 |
| | | | | 251/129.15 |

FOREIGN PATENT DOCUMENTS

| | | | |
|---|---|---|---|
| DE | 8529255 U1 | 1/1987 | ............ F16K 31/06 |
| DE | 10253460 A1 | 6/2003 | ............... F01L 9/04 |
| DE | 102005051177 A1 | 5/2007 | ............ F16K 31/06 |
| DE | 102008018018 A1 | 10/2009 | ............... F04B 1/04 |
| JP | 0443474 A | 2/1992 | ............... G06K 7/10 |
| JP | 064479 U | 1/1994 | ............ F16K 31/06 |
| WO | 2012/163892 A2 | 12/2012 | ......... F02M 59/366 |

OTHER PUBLICATIONS

Chinese Office Action, Application No. 201280026311.4, 12 pages, Jun. 2, 2015.
Japanese Office Action, Application No. 2014-513150, 2 pages, Jan. 5, 2016.
Chinese Office Action, Application No. 201280026311.4, 11 pages, Sep. 19, 2016.

\* cited by examiner

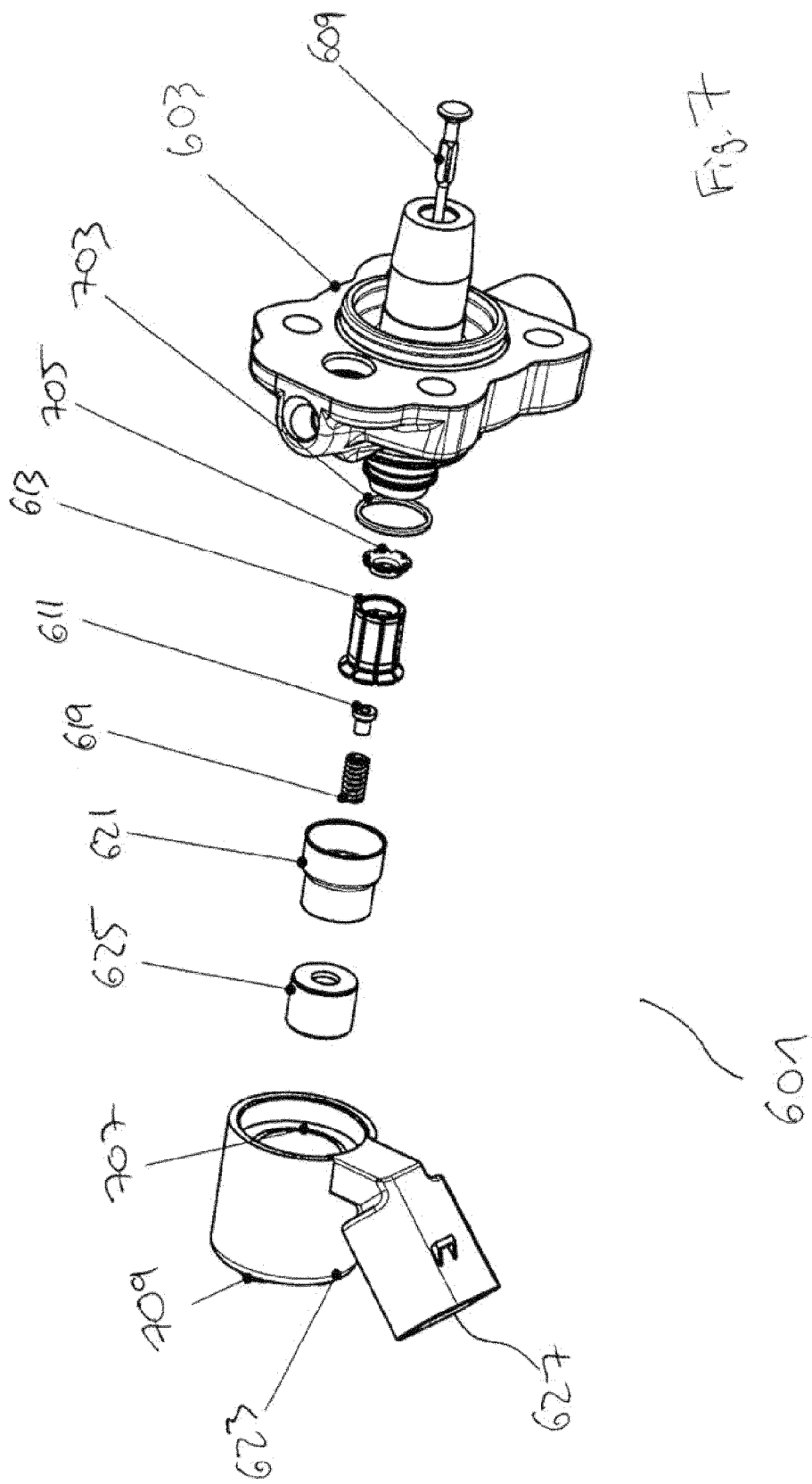

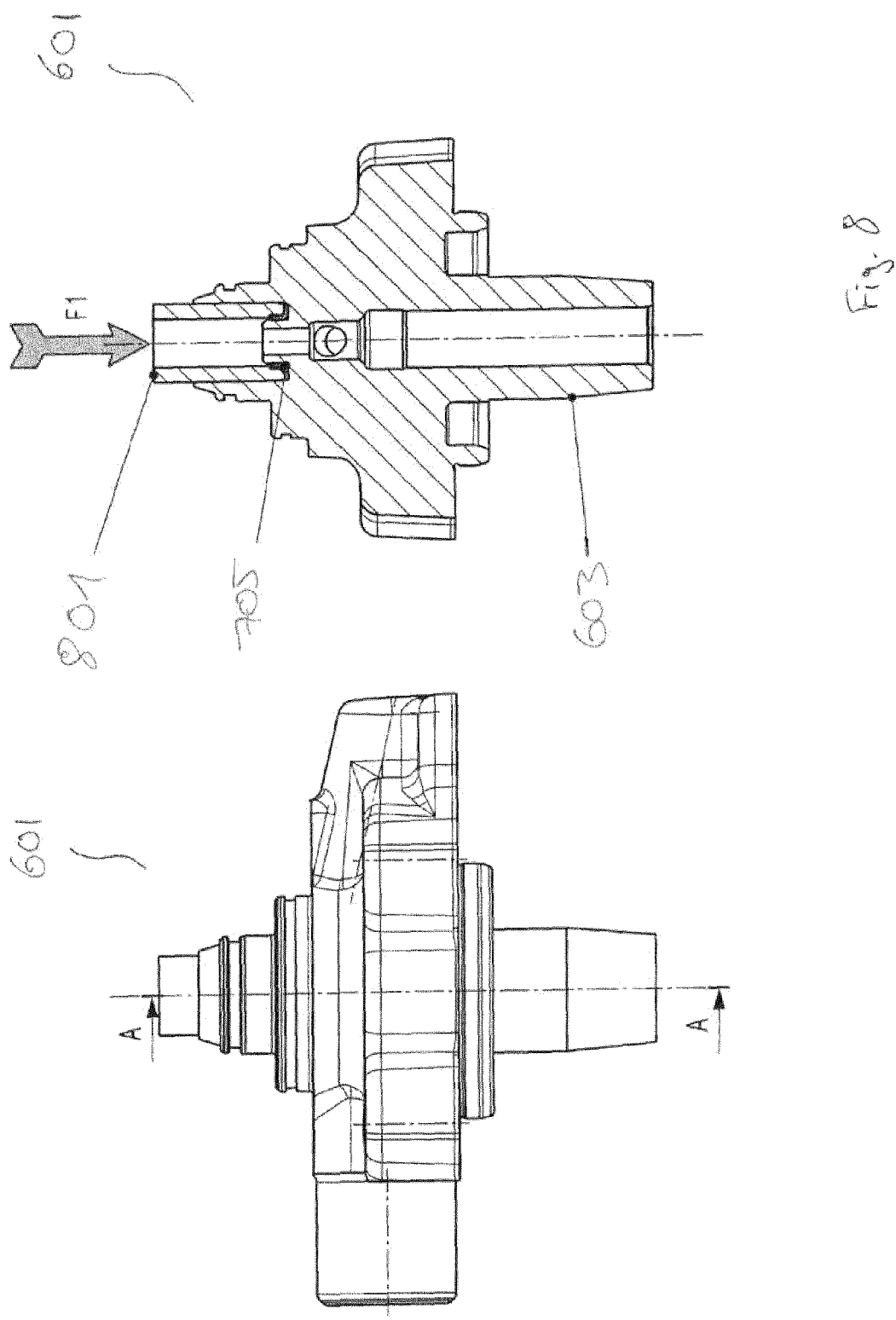

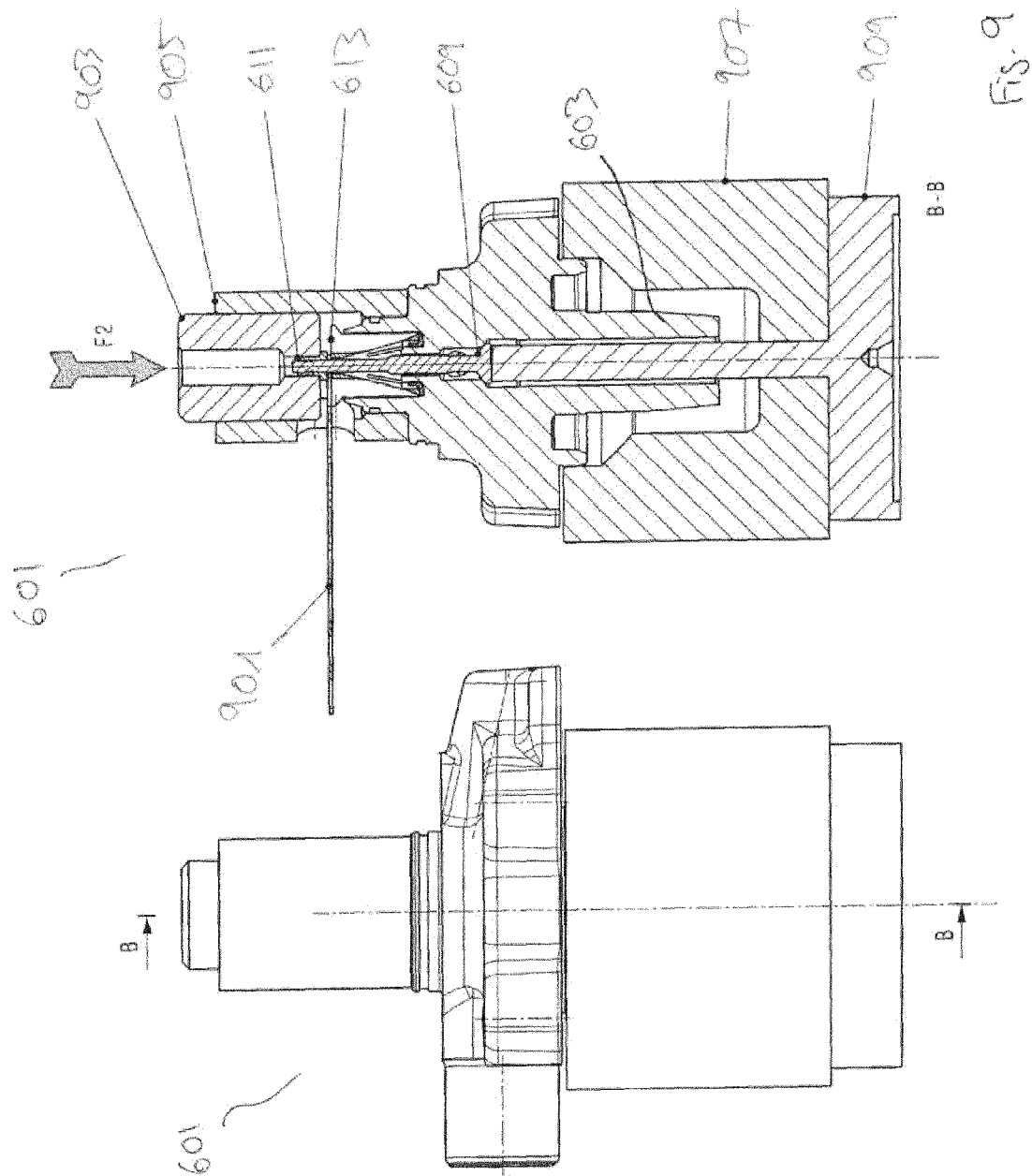

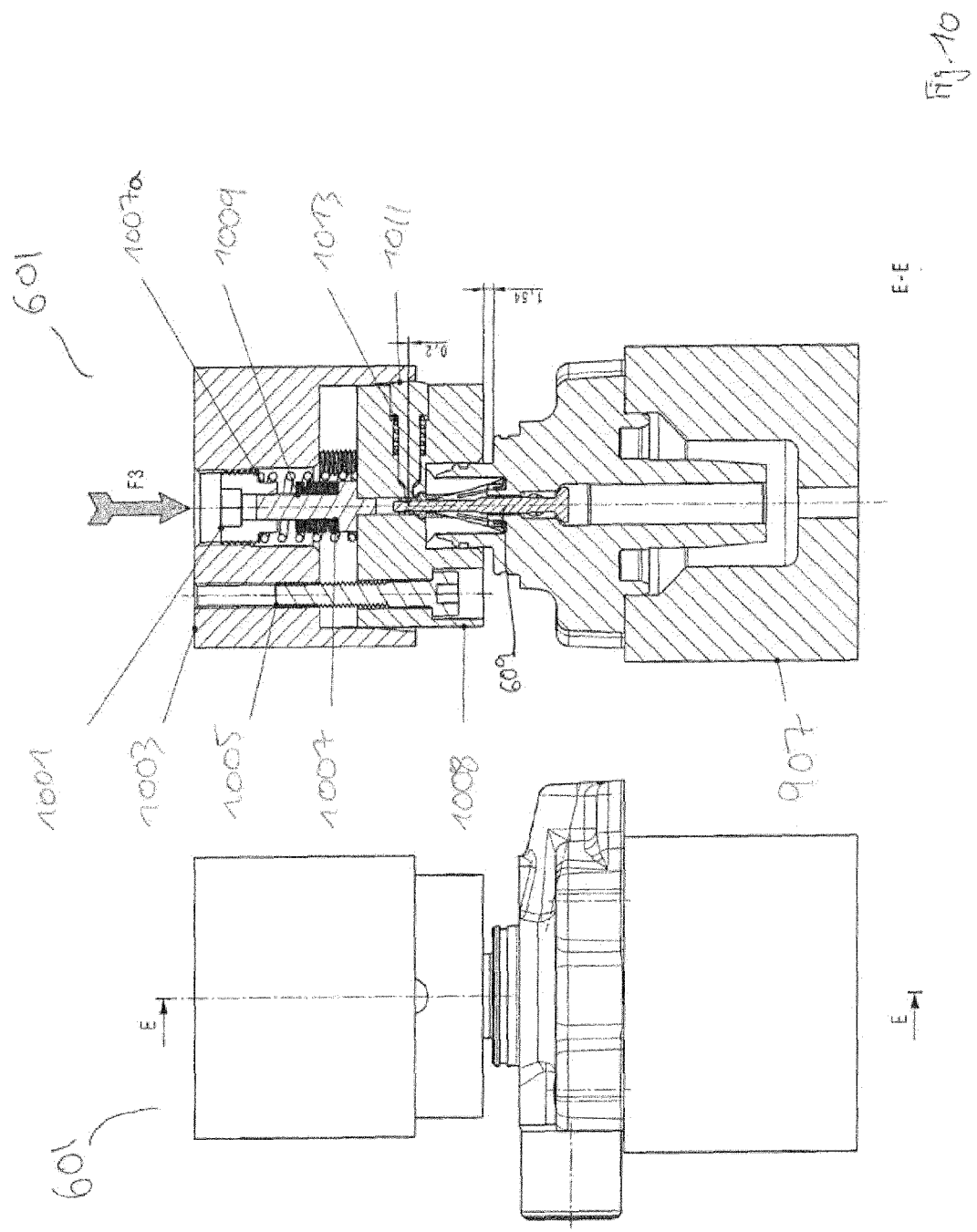

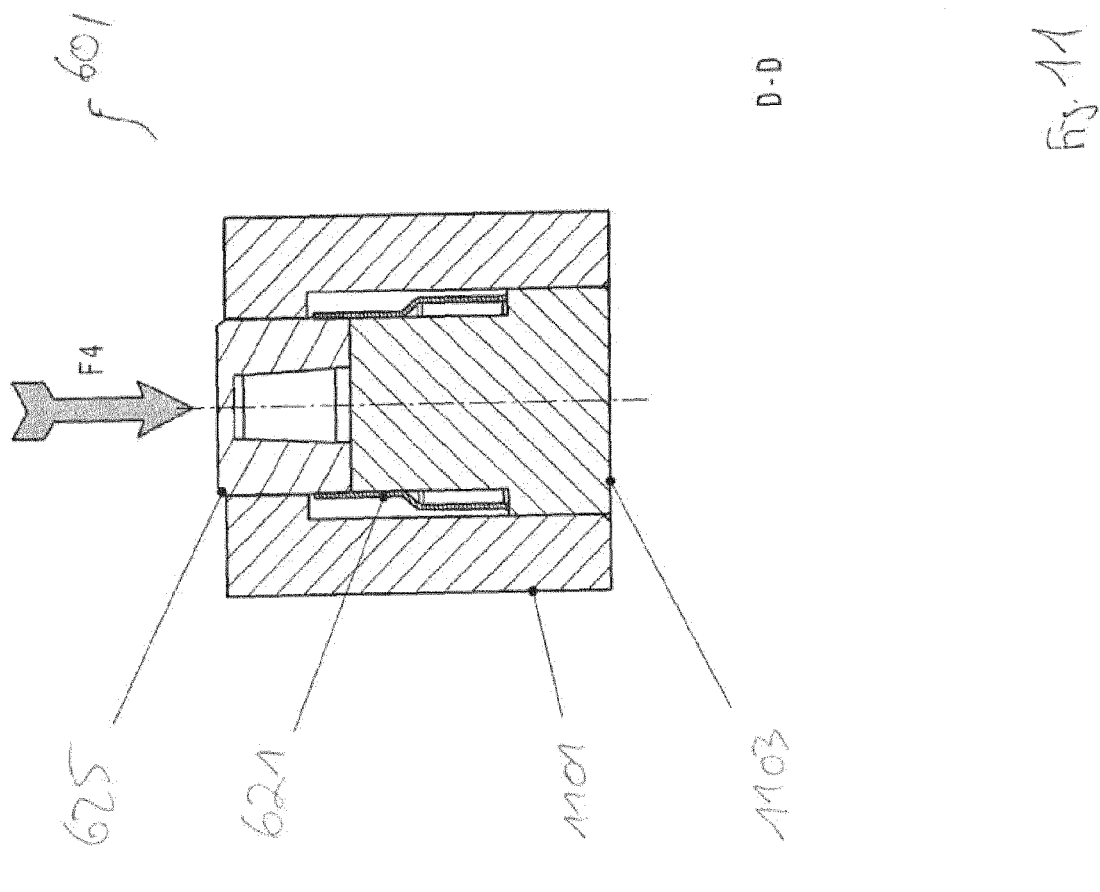
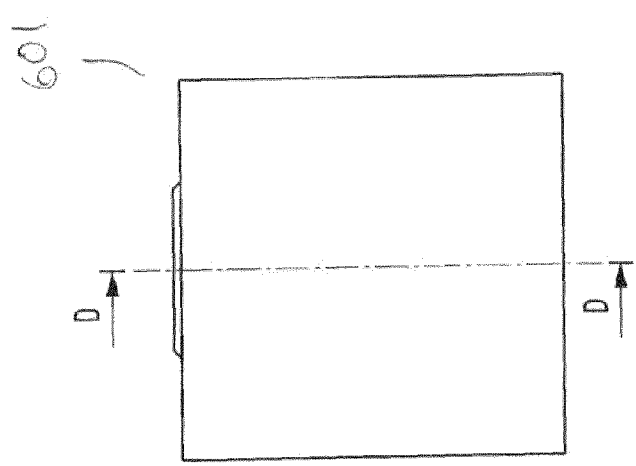

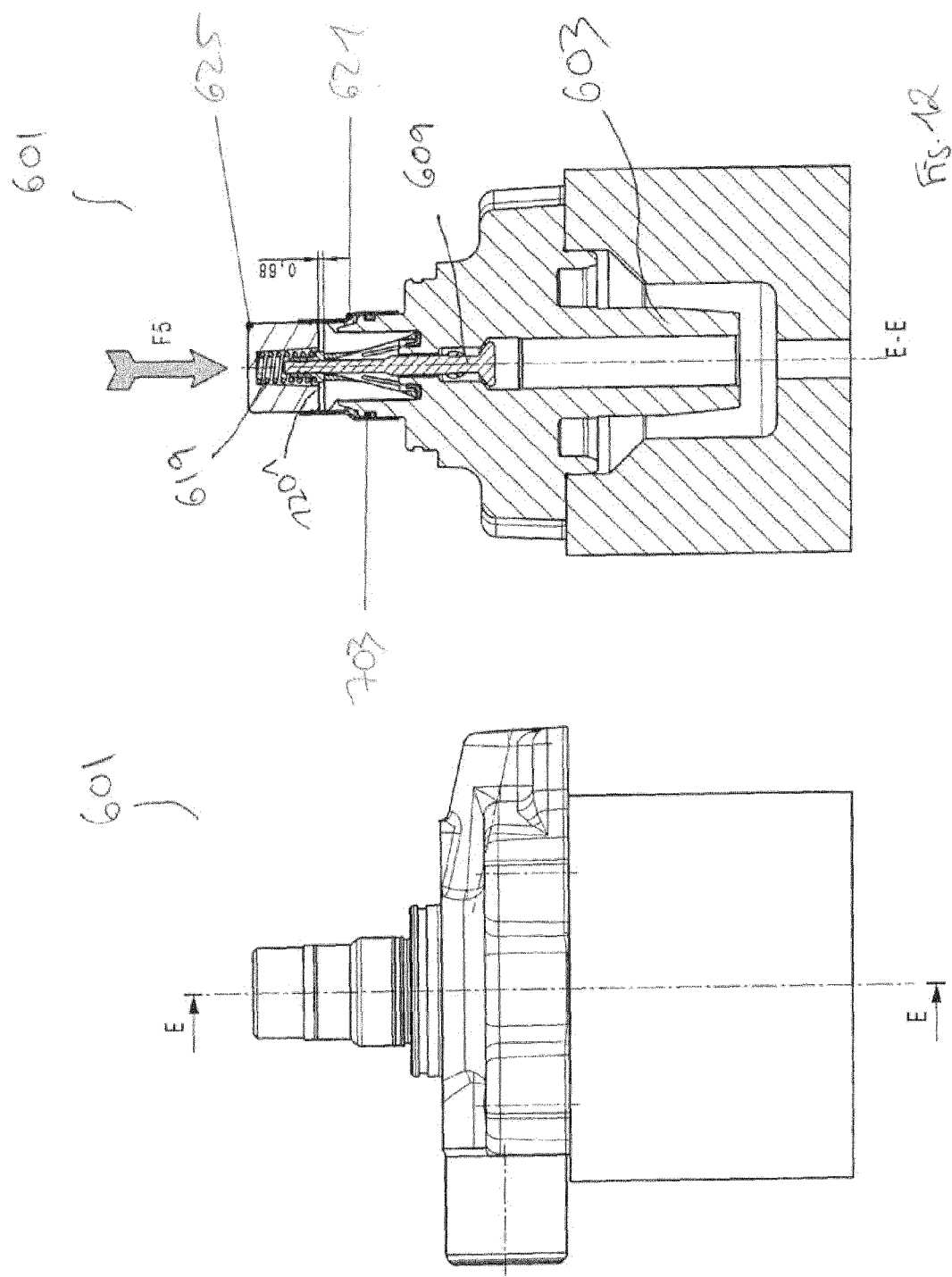

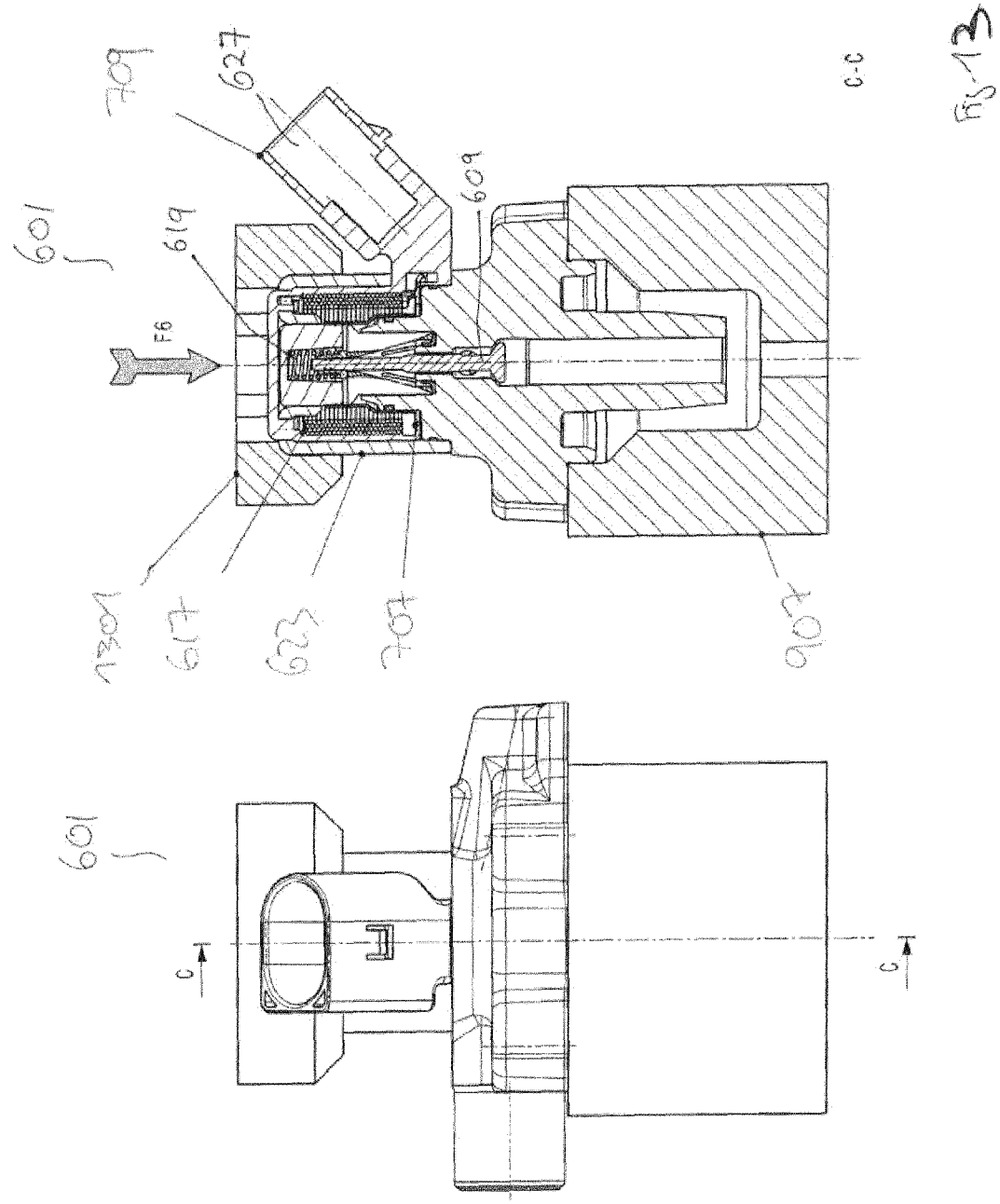

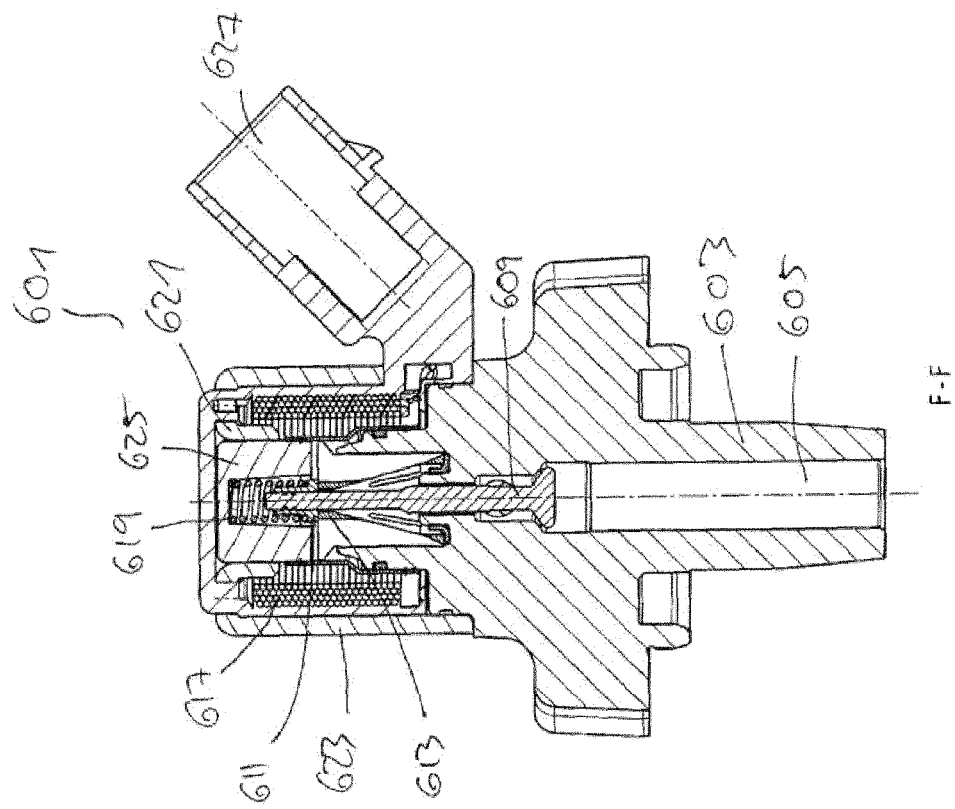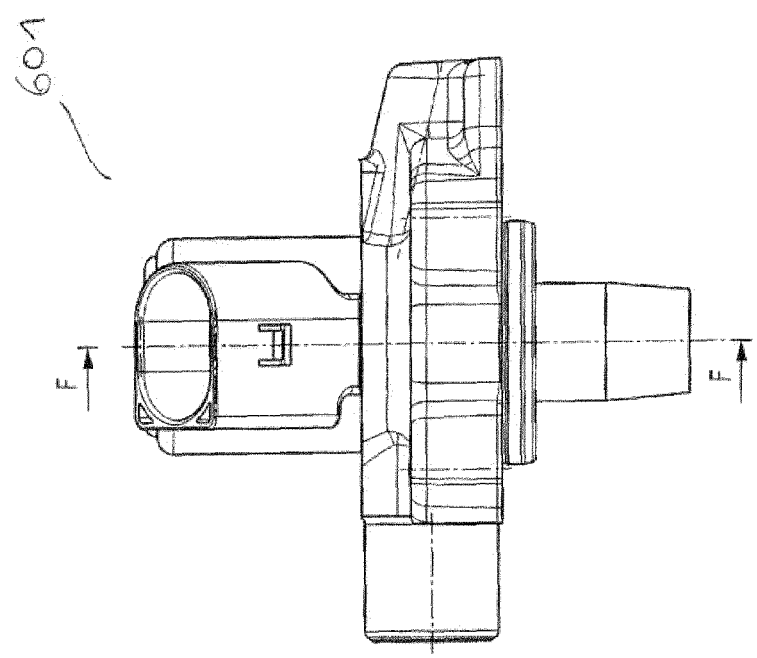
Fig. 14

METHOD FOR DETECTING A CLOSING TIME POINT OF A VALVE HAVING A COIL DRIVE, AND VALVE

CROSS-REFERENCE TO RELATED APPLICATIONS

This application is a U.S. National Stage Application of International Application No. PCT/EP2012/059990 filed May 29, 2012, which designates the United States of America, and claims priority to DE Application No. 10 2011 076 784.3 filed May 31, 2011, the contents of which are hereby incorporated by reference in their entirety.

TECHNICAL FIELD

The invention relates to an inlet valve for a fluid pump. The invention furthermore relates to an assembly method for an inlet valve for a fluid pump.

BACKGROUND

Inlet valves for gasoline or diesel pumps are known as such. Such valves generally comprise a fuel inlet opening and a tappet which can close said inlet opening. Furthermore, an actuator which can move the tappet to and fro is customarily provided. In the known valves, the actuator and the tappet are fixedly connected to each other.

A particular disadvantage of this design is that actuator movements which have a component transverse with respect to a longitudinal axis of the tappet lead to the tappet also executing transverse movements. This can lead in particular to the tappet no longer being able to completely close the inlet opening, since said tappet sits obliquely in a corresponding valve seat. This can lead in this respect to a higher leakage rate.

SUMMARY

In a first embodiment, an inlet valve for a fluid pump includes a movably mounted tappet configured to close a fluid inlet opening, and an actuator configured to move the tappet, wherein the actuator and the tappet are formed separately from each other and are coupleable to each other by a coupling element that transmits an actuator driving force to the tappet.

In a further embodiment, the coupling element decouples an actuator force acting transverse to a longitudinal axis of the tappet from the tappet.

In a further embodiment, the coupling element comprises a bushing connected to the tappet.

In a further embodiment, the inlet valve comprises a cylinder configured to guide the tappet.

In a further embodiment, the cylinder has a guide bore for guiding the actuator.

In a further embodiment, the inlet valve comprises a spring configured to hold the tappet in an open position.

In a further embodiment, the actuator has a magnetic armature configured to transmit an actuator driving force to the coupling element.

Another embodiment provides an assembly method for an inlet valve for a fluid pump, wherein a tappet is mounted movably for closing a fluid inlet opening, and an actuator is provided for moving the tappet, wherein the actuator and the tappet are formed separately from each other, and a coupling element is provided for transmitting an actuator driving force to the tappet, said coupling element being able to couple the actuator and the tappet to each other.

BRIEF DESCRIPTION OF THE DRAWINGS

Example embodiments of the invention are explained in more detail below with reference to the figures, in which:

FIG. 14 shows the mounted and finished inlet valve from FIGS. 8 to 13.

DETAILED DESCRIPTION

Figure 1:
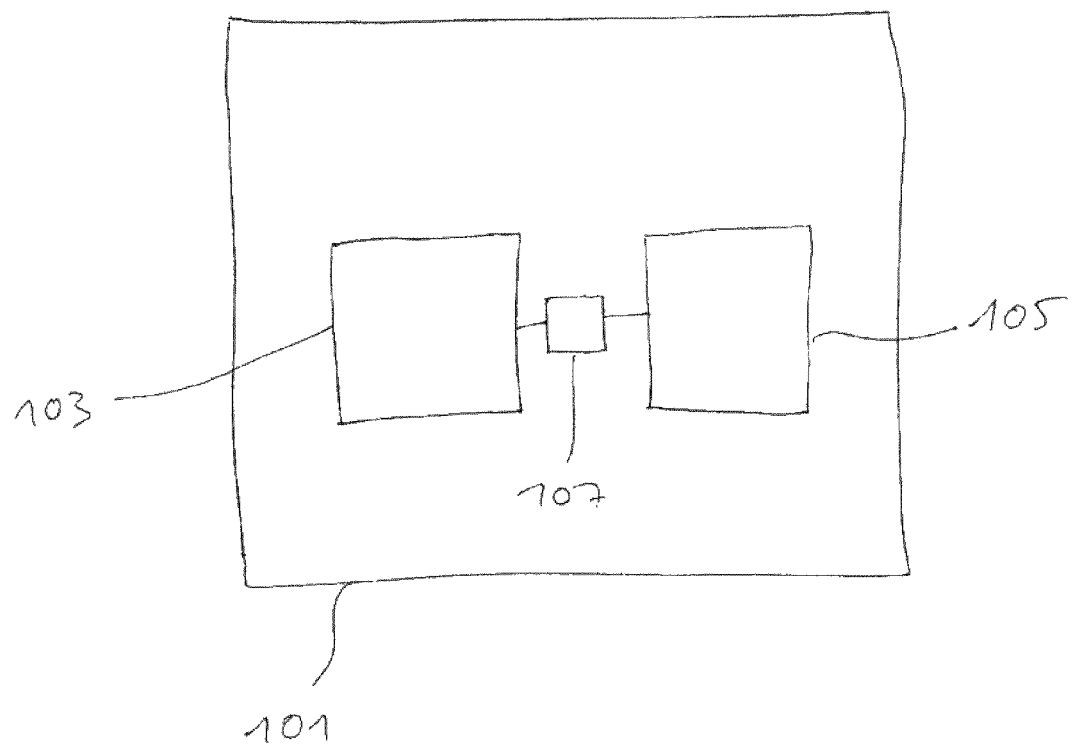
FIG. 1 shows an inlet valve for a fluid pump.

Embodiments of the present invention provide an inlet valve for a fluid pump, which inlet valve overcomes the known disadvantages and avoids leakage.

Other embodiments provide a corresponding assembly method for an inlet valve for a fluid pump.

One embodiment provides an inlet valve for a fluid pump, wherein the fluid pump comprises a movably mounted tappet for closing a fluid inlet opening, and an actuator for moving the tappet. In this case, the actuator and the tappet are formed separately from each other and are coupleable to each other by means of a coupling element for transmitting an actuator driving force to the tappet.

According to a further embodiment, an assembly method for an inlet valve for a fluid pump is provided, wherein a tappet is mounted movably for closing a fluid inlet opening, and an actuator is provided for moving the tappet. Furthermore, the actuator and the tappet are formed separately from each other. Furthermore, a coupling element is provided for transmitting an actuator driving force to the tappet, said coupling element being able to couple the actuator and the tappet to each other.

Due to the fact that the actuator and the tappet are formed separately from each other, an actuator movement which, in particular, has a component transverse with respect to a longitudinal axis of the tappet does not lead to a corresponding transverse movement of the tappet if the tappet and the actuator are not coupled to each other. Wear to the tappet because of said undesired transverse movements can therefore advantageously be avoided. The tappet can also be referred to as a control pin.

The fluid pump may be a fuel pump, e.g., a gasoline or diesel pump. The fluid is then correspondingly a fuel, in particular petrol or diesel. The inlet valve can be, in particular, a digitally controlled inlet valve. For example, said inlet valve may also be an integrated, digitally controlled inlet valve. Integrated here means in particular that the inlet valve is integrated on a cylinder of a fluid pump, in particular a gasoline or diesel pump. Since the inlet valve can control, in particular, a quantity of fluid or a volume of fluid, said inlet valve in this respect can also control a through flow to an injection system, in particular to a common rail system. The inlet valve can also be referred to in this respect as a volume control valve. In particular, the inlet valve can be formed as a currentlessly open, digitally switched valve. Currentlessly open means, in particular, that, when no voltage is applied to the inlet valve, the tappet or the control pin is in an open position, and therefore the fluid inlet opening is not closed.

According to one embodiment, the inlet valve can be formed as a currentlessly open (CO) valve. Currentlessly open means, in particular, that, if no current or voltage is applied to the inlet valve, the tappet or control pin is in an open position, and therefore the fluid inlet opening is not closed.

According to a further embodiment, the inlet valve can be formed as a currentlessly closed (CC) valve. Currentlessly closed means, in particular, that, if no current or voltage is applied to the inlet valve, the tappet or control pin is in a closed position, and therefore the fluid inlet opening is closed.

According to one embodiment, the coupling element is formed so as to decouple an actuator force acting transversely with respect to a longitudinal axis of the tappet from the tappet. A longitudinal axis is defined here as the axis which is formed along the direction of greatest extent of the tappet. This embodiment in particular affords the advantage that transverse forces which act on the actuator are not transmitted, or at most are scarcely transmitted, to the tappet, even when the actuator and the tappet are coupled to each other by means of the coupling element. Said transverse forces with respect to the tappet are particularly undesirable, therefore, because said forces can press the tappet obliquely into a valve seat for closing the fluid inlet opening, and therefore the valve can be closed with difficulty, if at all, thus enabling leakage and wear to occur. Furthermore, this embodiment in particular affords the advantage that exclusively axial forces, that is to say, forces in the direction of the longitudinal axis of the tappet, are transmitted to the tappet by means of the actuator. This permits a particularly rectilinear guidance of the tappet, and this also advantageously reduces or even avoids wear. In this preferred embodiment, the tappet and the actuator are therefore decoupled radially from each other. Radially refers here in particular to a transverse direction relative to the longitudinal axis of the tappet.

According to another embodiment, the coupling element is a bushing which is connected to the tappet. During operation of the inlet valve, the actuator presses in particular onto the bushing and thus moves the tappet. The bushing therefore permits, in particular, a transmission of force from the actuator to the tappet. Furthermore, simple setting of a tappet stroke is made possible by the provision of the bushing. In particular, the tappet can be connected to the bushing by means of a press fit. A particularly firm connection between the bushing and the tappet is made possible, in particular, by means of crimping.

In another embodiment, a cylinder is provided for guiding the tappet. For this purpose, the cylinder has a bore, in particular a through bore, along the longitudinal axis thereof. As a result, simple and precise guidance of a tappet movement is made possible in particular in an advantageous manner. The cylinder preferably has a guide bore for guiding the actuator. As a result, simple and precise guidance of an actuator movement is also made possible in an advantageous manner. In particular, the cylinder has both a first guide bore for guiding the tappet and a second guide bore for guiding the actuator. This embodiment affords in particular the advantage that, due to the independence of the two guides from each other, guide play at the actuator guide can be kept small, and therefore an eccentricity of the actuator in relation to the cylinder can also be kept small. As a result, in an advantageous manner, transverse forces become smaller than friction forces. Furthermore, more stable switching times of the inlet valve are also made possible as a result. The actuator can either be guided preferably at the inside diameter thereof or in particular at the outside diameter thereof. In particular, the embodiment of guidance at the inside diameter affords the advantage that particularly precise and rectilinear guidance is made possible by this means.

According to a further embodiment, a spring is provided for holding the tappet in an open position. The spring therefore presses in particular the tappet into a position in which the fluid inlet opening is not closed. In particular if no actuator driving force acts on the tappet, the tappet is thus held in an open position. This has the advantage that, if, for example, no electric voltage for actuating the actuator is applied to the inlet valve, the inlet valve is open. When the actuator is actuated, the actuator pushes the tappet via the coupling element counter to the spring force into a closed position in which the tappet closes the fluid inlet opening. In this connection, in particular the tappet is pressed into a valve seat, wherein the presence of a valve seat is intended not to be restricted only to this embodiment but rather can generally be provided in all of the embodiments.

In another embodiment, the actuator has a magnetic armature for transmitting an actuator driving force to the coupling element. The magnetic armature is preferably guided in the guide bore of the cylinder. The actuator preferably has a coil arrangement which, in particular, is designed, when appropriately electrically energized, to form a corresponding magnetic field which can attract the magnetic armature, in particular counter to a possibly present spring force, thus permitting movement of the magnetic armature. Transverse forces which act on the magnetic armature and which can be caused, for example, due to magnetic influences are not transmitted, or are scarcely and therefore negligibly transmitted, to the tappet because of the separation of actuator and tappet.

In another embodiment, the tappet is formed, for example, from the material 100Cr6. The armature is preferably formed from a magnetically stainless steel. In particular, the cylinder is formed from the material 100Cr6. The bushing is preferably formed from a nonmagnetic stainless steel.

In one embodiment of the assembly method, provision can be made in particular for a function test of the inlet valve to be able to be carried out before and/or after each individual assembly step. Such a function test comprises in particular a seal test which, in particular, checks the tightness of the inlet valve. That is to say that, in particular, a check is made of the sealing behavior and in particular of whether the tappet adequately closes the fluid inlet opening. In particular, the sealing behavior can also be checked directly pneumatically. The inlet valve is preferably switched with a test coil before, during and/or after each assembly step, as a result of which switching currents and/or switching times can be measured in an advantageous manner. It is then possible for, for example, further adjustment processes, such as adjustment of a spring force or orientation of the coil of a coil former, to be carried out in accordance with the measured switching currents and switching times. By means of the test coil, it is made possible in particular to check valve parameters, such as, for example, throughflow, leakage or switching times.

In conjunction with the assembly method, the fact that the actuator and the tappet are formed separately from each other affords the advantage that, in particular in the case of unsatisfactory test results, the inlet valve can simply be removed again and the individual parts, such as, for example, the actuator or the tappet, can be exchanged or recycled. Material is thus saved in an advantageous manner.

FIG. 1 shows an inlet valve 101 for a fluid pump (not shown). The fluid pump is preferably a gasoline or a diesel pump. The inlet valve 101 comprises a tappet 103. The tappet 103 is mounted movably and can close a fluid inlet opening (not shown). The inlet valve 101 furthermore comprises an actuator 105 which can move the tappet 103. For this purpose, the actuator provides, in particular, an actuator driving force. The tappet 103 and the actuator 105 are formed separately from each other. So that an actuator driving force can be transmitted to the tappet, a coupling element 107, by means of which the actuator 105 and the tappet 103 are coupleable to each other, is provided.

In an embodiment (not shown), the coupling element 107 is furthermore formed so as to decouple an actuator force acting transversely with respect to a longitudinal axis of the tappet 103, in particular actuator driving force, from the tappet 103. Due to said radial decoupling, wherein radially refers to a transverse direction relative to the longitudinal axis of the tappet 103, only axial actuator forces, i.e. actuator forces acting in the direction of the longitudinal axis, in particular actuator driving forces, are transmitted to the tappet 103 by means of the actuator 105. Transverse forces are not transmitted to the tappet 103, and therefore the tappet 103 can advantageously reliably and securely close the fluid inlet opening. This advantageously in particular reduces or avoids leakage. Furthermore, material wear of the tappet 103 is also reduced.

Figure 2:
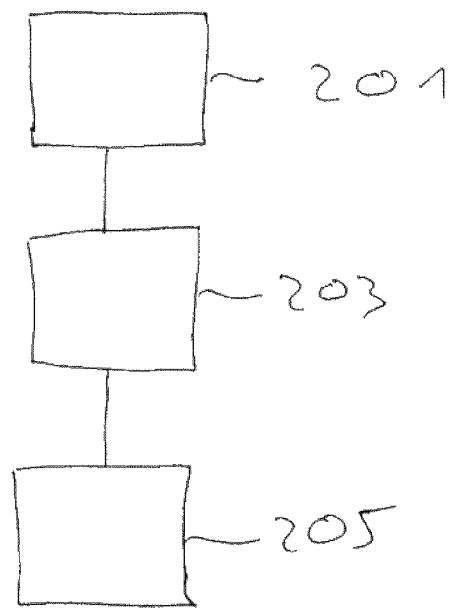
FIG. 2 shows a schematic flow diagram of an assembly method for an inlet valve for a fluid pump.

FIG. 2 shows a flow diagram of an assembly method for an inlet valve for a fluid pump. In a step 201, a tappet is provided for closing a fluid inlet opening and an actuator is provided for moving the tappet, wherein the tappet is mounted movably. In a step 203, the actuator and the tappet are formed separately from each other, wherein, in a step 205, a coupling element which can transmit an actuator driving force to the tappet is provided. By means of the coupling element, in particular coupling of the actuator to the tappet is made possible.

In an embodiment (not shown), test methods or test steps, in which a correct function of the components just installed is checked, can be provided before and/or after and/or between the steps 201, 203 and 205. In particular, in this connection, sealing behavior can be checked pneumatically, in particular directly pneumatically.

Figure 3:
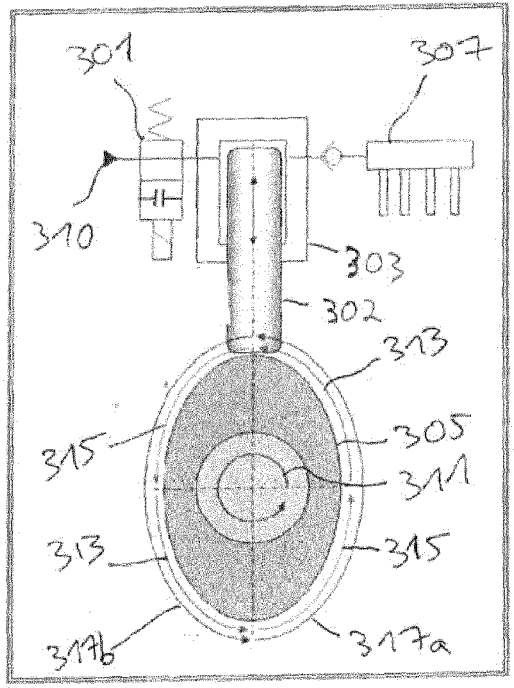
FIG. 3 shows an inlet valve for a fluid pump integrated in a common rail injection system.

FIG. 3 shows an inlet valve 301 of a fluid pump, in particular of a gasoline or diesel pump. The inlet valve 301 has a piston 302 which is guided in a cylinder 303. The piston 302 is connected to a cam 305 and interacts therewith. The inlet valve 301 in particular controls a fuel throughflow, for example a gasoline or diesel throughflow, to a common rail injection system. FIG. 3 shows a high-pressure connection 307 of the common rail injection system. In this case, the inlet valve 301 controls a volume of fuel between a low-pressure connection 310 of the common rail injection system and the high-pressure connection 307.

The arrow with the reference number 311 identifies a direction of revolution of the cam 305. The arrows with the reference number 313 identify a movement phase of the cam 305, in which a fuel is sucked up. The arrows with the reference number 315 identify a movement phase of the cam 305, in which the fuel is compressed. The suction phase alternates here with the compression phase with a 90° phase displacement.

The two arrows with, respectively, the reference numbers 317a and 317b respectively identify a cam movement over a compression phase and a suction phase.

The inlet valve 301 is formed as a CO (currentlessly open) valve. That is to say, if a control current is not applied, the valve 301 is in an open position. In an embodiment (not shown), provision can be made for the inlet valve 301 to be formed as a CC (currentlessly closed) valve. That is to say, if a control current is not applied, the valve 301 is in a closed position.

Figure 4:
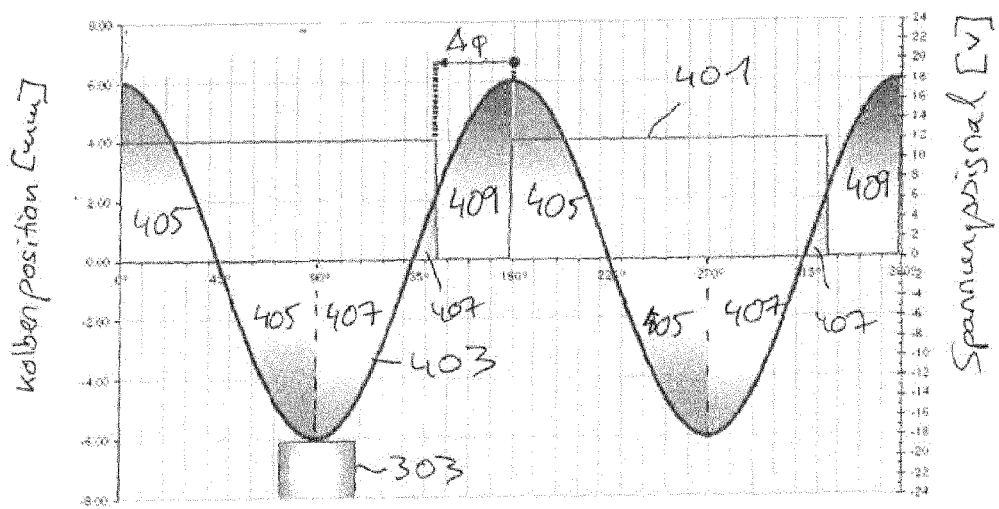
FIG. 4 shows a graphical dependency of a piston position on a cam rotation angle.

FIG. 4 shows a graph in which a piston position is plotted in millimeters on the left ordinate. On the right ordinate, a voltage signal is plotted in volts and is used for PWM current control for the purpose of actuating the inlet valve 301, wherein "PWM" stands for the English term in the art "pulse-width modulation". In German speech, use is customarily made of the terms "Pulsweitenmodulation [pulse-width modulation]", "Pulsbreitenmodulation [pulse-length modulation]" or "Pulsdauermodulation [pulse-duration modulation]". On the abscissa, a rotation angle of the cam 305 is plotted in degrees. The dependency of the voltage signal on the cam rotation angle is denoted by means of the curve with the reference number 401. The dependency of the piston position on the cam rotation angle is denoted by means of the curve with the reference number 403. A phase difference between the two graphs 401 and 403 is denoted by way of example by $\Delta\phi$. The dependencies, which are illustrated in the graph, of the individual physical variables are typical for the construction shown in FIG. 3 when the inlet valve 301 is formed as a CC valve.

In the regions with the reference number 405, fuel is sucked up from the low-pressure connection 310. The regions 405 go from 0° to 45°, from 45° to 90°, from 180° to 225° and from 225° to 270°, with respect to the abscissa.

In the regions with the reference number 407, fuel flows toward the low-pressure region 310. The regions 407 go from 90° to 135°, from 135° to 145°, from 270° to 315° and from 315° to 325°, with respect to the abscissa.

In the regions with the reference number 409, fuel flows in the direction of the high-pressure connection 307. The regions 409 go from 145° to 180° and from 325° to 360°, with respect to the abscissa.

Figure 5:
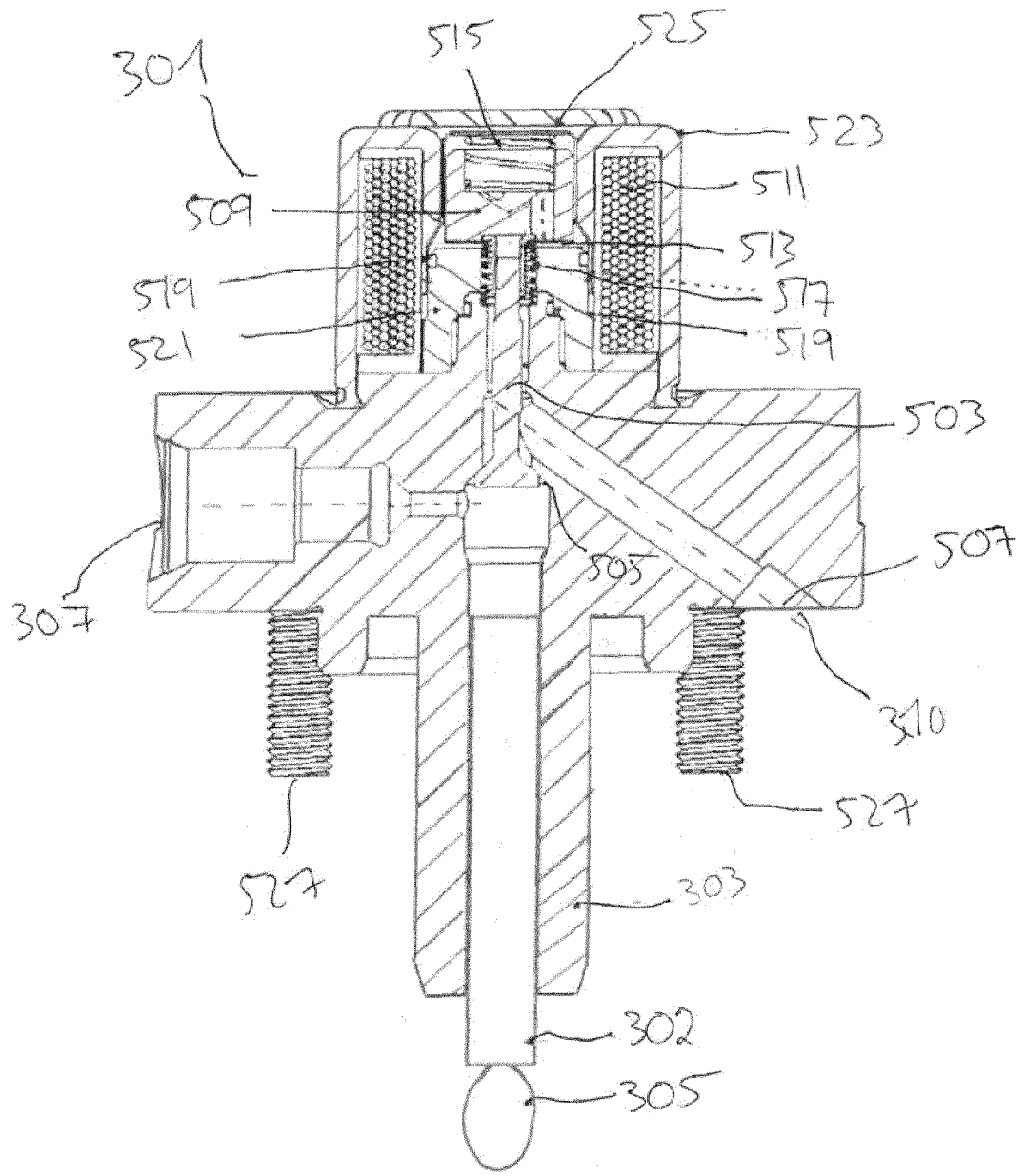
FIG. 5 shows a further inlet valve for a fluid pump.

FIG. 5 shows a detailed view of the inlet valve 301 which is formed here as a CC valve. As can be seen, the piston 302 is guided in a guide bore in the cylinder 303. The inlet valve 301 comprises a tappet 503 which, in a closed position, sits in a valve seat 505, as a result of which an inlet opening 507 of the low-pressure connection 310 is closed, and therefore fuel cannot flow through the inlet valve 301.

If the tappet 503 is moved downward in the direction of the piston 302, the inlet opening 507 opens as a result and fuel can flow from the low-pressure connection 310 to the high-pressure connection 307.

An armature 509 comprising a magnetic material is formed for actuating the tappet 503. Furthermore, a coil 511 is provided, said coil, when appropriately electrically energized, generating a magnetic field. As a result, the armature 509 can be moved in the opposite direction, with respect to the piston 302, i.e. away from the piston 302, in the direction of the longitudinal axis of the tappet 503. The coil 511 and the armature 509 here form an actuator for moving the tappet 503.

Furthermore, an intermediate tappet 513 is provided, said intermediate tappet being fixedly connected to the tappet 503. The tappet 503 together with the intermediate tappet 513 is formed separately from the armature 509. When the coil 511 is actuated, the magnetic armature 509 presses against the intermediate tappet 513 and thus presses the tappet 503 downward in the direction of the piston 302 such that the fluid inlet opening 507 is opened. The intermediate tappet 513 in this respect forms a coupling element for transmitting an actuator driving force to the tappet 503 by the intermediate tappet 513 coupling the magnetic armature 509 to the tappet 503.

A spring 515 which pushes the intermediate tappet 513 downward in the direction of the piston 302 is formed at the upper end of the inlet valve 301, with the lower end of the inlet valve 301 pointing in the direction of the cam 305. Furthermore, a further spring 517 which has a greater spring constant than the spring 515 is formed. The further spring 517 therefore produces a greater spring force than the spring 515. In this respect, the spring 517 can also be referred to as a strong spring. The spring 515 can also be referred to in this respect as a weak spring. The armature 509 is arranged between the weak spring 515 and the strong spring 517, and therefore, if the coil 511 is not energized, i.e. the armature 509 is not actuated, the strong spring 517 presses the armature 509 upward away from the piston 302 into an upper position. The valve 301 is in this respect closed.

If the armature 509 is actuated, i.e. the coil 511 is energized, the armature 509 presses on the intermediate tappet 513 and therefore on the tappet 503, thus opening the inlet opening 507.

Furthermore, a magnetic core 521 which is likewise surrounded by the actuator is also formed. Moreover, a yoke ring 523 is provided for pressing together the coil 511, the armature 509 and the magnetic core 521. A sleeve 525 is also provided, the sleeve acting as a cover of the inlet valve 301 such that the inlet valve 301 is advantageously sealed off from the external environment. Furthermore, two O-rings 519 are also provided for sealing off the inlet valve 301 and the sleeve 525 and the magnetic core 521.

Furthermore, two threaded screws 527 are arranged on the inlet valve 301 and can be used to screw the inlet valve 301 onto a gasoline or diesel pump for fastening purposes.

Figure 6A:
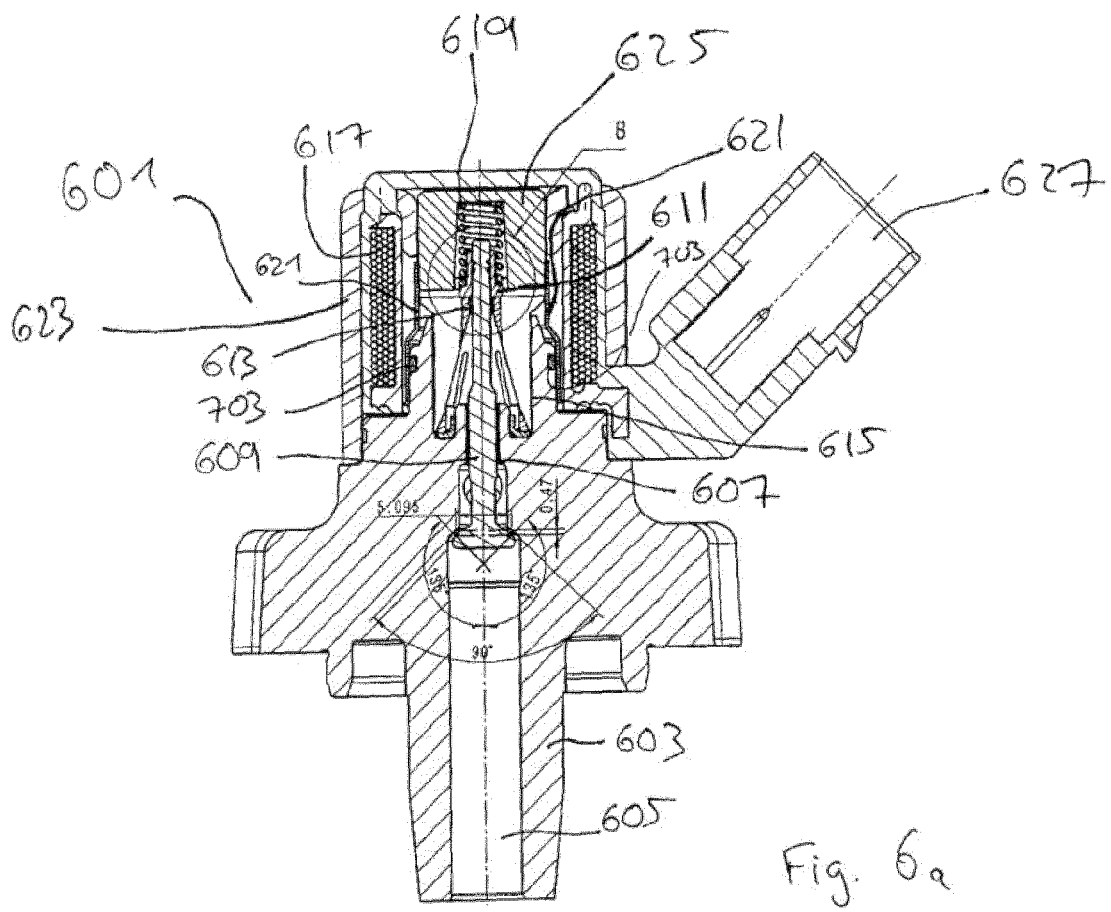
FIG. 6a shows a different inlet valve for a fluid pump.
Figure 6B:
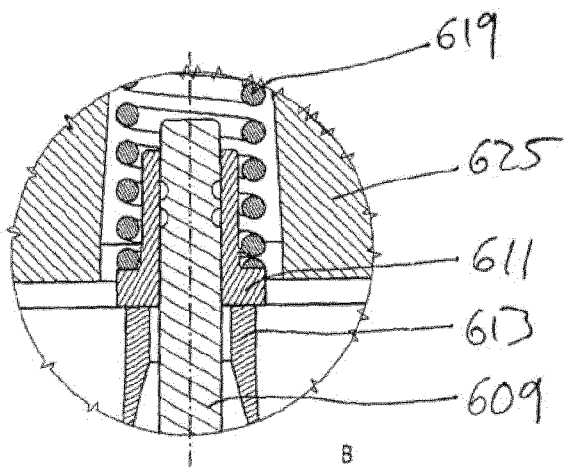
FIG. 6b shows an enlarged view of a detail from the inlet valve in FIG. 6a, FIG. 7 shows an exploded illustration of the inlet valve shown in FIG. 6a, FIGS. 8 to 13 each show views of intermediate assembly states of the inlet valve, which is shown in FIG. 6, during an embodiment of the assembly method.

FIG. 6a shows a further inlet valve 601 which is formed as a CO valve. In the drawing in FIG. 6a, a region which is illustrated on an enlarged scale in FIG. 6b is denoted by "B".

The inlet valve 601 has a cylinder 603 in which a piston 605 can be moved to and fro. The piston 605 can interact with a cam (not shown) analogously to FIG. 5.

A guide 607 for a tappet 609 is formed above the cylinder 603. The tappet 609 is preferably formed from the material 100Cr6. The tappet 609 is fixedly connected to a bushing 611.

Concentrically around the tappet 609, an armature 613 made of a magnetic material is formed in an armature guide 615 in a manner separated from the bushing 611 and the tappet 609. A coil 617 is arranged concentrically around the magnetic armature 613, said coil, when appropriately electrically energized, being able to generate a magnetic field. It is therefore made advantageously possible to move the magnetic armature 613 in the direction of a longitudinal axis of the tappet 609. In this case, the magnetic armature 613 is arranged in such a manner that, during a movement in the direction away from the cylinder 603, said armature presses onto the bushing 611 and can thus move the tappet 609 in a direction away from the cylinder 603. The bushing 611 in this respect forms a coupling element for transmitting an armature driving force to the tappet 609.

A spring 619 which, by means of the spring force thereof, presses the tappet 609 in the direction of the cylinder 603 is formed at that end of the tappet 609 which is at the top with respect to the plane of the figure. If the armature 613 is therefore not actuated, the spring 619 presses the tappet 609 into an open position in which the tappet 609 does not close a fluid inlet opening (not shown). The inlet valve 601 is formed in this respect as an inlet valve switched in a currentlessly open manner.

Furthermore, the inlet valve 601 also comprises a sleeve 621 and a yoke ring 623 for pressing together and sealing a magnetic core 625 which, together with the magnetic armature 613 and the coil 617, forms an actuator for moving the tappet 609. The sleeve 621 can be formed in particular as a thin-walled bushing and, in particular, is pressed at the top onto the magnetic core 625 and can then preferably be subsequently welded, wherein provision can be made, for example, for the sleeve 621 to be pushed at the bottom over an O-ring 703 and in particular to be subsequently welded to the cylinder 603. Sealing of an armature space can thus be implemented in an advantageous manner.

Furthermore, the inlet valve 601 comprises a coil connector 627 for connecting a control cable for the coil 617.

Furthermore, dimensions are shown in FIG. 6a in millimeters and angle details in degrees, but these are merely to be understood as being by way of example and not as limiting.

FIG. 7 shows an exploded illustration of the inlet valve 601 from FIG. 6a. Further elements of the inlet valve 601 can be seen better by means of the exploded illustration. Said elements are, for example, the O-ring 703, a nonmagnetic disk 705, a coil former 707, in which the coil 617 is arranged, and a cover housing 709 which is provided on the yoke ring 623. The cover housing 709 in particular surrounds the coil connector 627.

FIG. 8 to FIG. 14 each show various intermediate assembly states in an assembly method for the inlet valve 601. In FIGS. 8 to 14, the left-hand drawing in each case shows a side view of the inlet valve 601 and the right-hand drawing shows a sectional view along the section line shown in the left-hand drawing, said section lines being respectively denoted by A-A, B-B, E-E, D-D, E-E, C-C and F-F.

For the sake of clarity, not all of the elements are always denoted by the corresponding reference numbers.

With reference to FIG. 8, according to one assembly step, the nonmagnetic disk 705 is mounted onto and pressed into the cylinder 603 by means of a pressing-in tool 801. The pressing-in operation is denoted here by means of an arrow F1.

FIG. 9 shows how the bushing 611 is pressed on. An adjustment disk 901 which can adjust a distance between the bushing 611 and the armature 613 is provided here. The pressing of the bushing 611 onto the tappet 609 is carried out by means of corresponding press-on tools 903 and 905. The pressing-on operation itself is denoted by an arrow F2. Furthermore, a mounting 907 is provided for the cylinder 603. Furthermore, a mounting 909 is also provided for the tappet 609. The cylinder 603 and the tappet 609 can be held in a particularly simple and secure manner by means of the two mountings 907 and 909, and therefore the individual assembly steps can be carried out simply and reliably.

Furthermore, a valve stroke of the inlet valve 601 is adjusted. In the process, the tappet 609 is pressed against the cylinder seat thereof. The adjustment disk 901 is then pushed between the armature 613 and the magnetic core 625. The armature 613 is pressed downward as far as the stop. The adjustment disk 901 is then subsequently removed, and therefore the valve stroke has been advantageously adjusted. An air gap, which can also be referred to as a residual air gap, is furthermore formed between the magnetic core 625 and the armature 613. It is advantageously made possible as a result for the tappet 609 to be sealed off in the cylinder seat thereof.

FIG. 10 shows calking of the bushing 611, this being denoted symbolically by an arrow F3. An adjustment bolt 1001 which comprises a pressure cone 1003 and a hexagonal screw 1005 is in particular provided for the calking. A spring washer 1007 for a tool spring 1007a can also be readily seen in FIG. 10. A spring guide 1009 for the spring 619 can likewise be readily seen. A calking pin 1011 with a calking pin spring 1013 can also be readily seen in FIG. 10. In particular, three such calking pins in total are provided, with, for the sake of clarity, only one calking pin being shown. If pressure is applied from above to the adjustment bolt 1001 with the force F3, the three calking pins 1011 are thereby moved inward and thus press onto the bushing 611. The bushing 611 is thereby advantageously calked to the tappet 609 at three points.

A guide for the hexagonal screw 1005 is denoted by the reference number 1008. The dimensions shown in millimeters in FIG. 10 should also be understood here merely as being by way of example and not as being limiting.

FIG. 11 shows how the magnetic core 625 can be pressed into the sleeve 621. Said pressing-in operation is illustrated symbolically by means of an arrow F4. A guide for the sleeve 621 in the magnetic core 625 is denoted by the reference number 1101. An inner guide is denoted by the reference number 1103.

FIG. 12 shows how the magnetic core 625 and the sleeve 621 are pressed onto the cylinder 603. This pressing-on operation is illustrated symbolically by means of an arrow F5.

Furthermore, it is shown in FIG. 12 how a net spring force is adjusted and a residual air gap 1201 is adjusted. The corresponding dimension, which is shown in FIG. 12, for the residual air gap 1201 should merely be considered as being by way of example and not as being limiting. The armature 613, the spring 619 and the sleeve 621 are fitted in the process. In order to adjust the spring force, in particular the sleeve 621 is pushed downward in various steps. Upon each step, the inlet valve 601 is switched with a test coil, and switching currents and/or switching times are measured. When the desired switching currents or switching times are reached, the adjustment process can be ended. The test coil is then in particular removed and the sleeve 621 is welded to the magnetic core 625. The sleeve 621 can preferably also be crimped onto the cylinder 603. For this purpose, a groove is provided in particular on the cylinder 603. Since the connecting sleeve is sealed off by the magnetic core, the adjustment process can take place hydraulically by means of an O-ring. In particular before the welding, it is made possible for the valve parameters, such as throughflow, leakage or switching times, to be checked by means of the test coil. If the test results are unsatisfactory or are incorrect, the inlet valve 601 can simply be removed again in order, in particular, to reuse the cylinder 603. The magnetic core 625 here is screwed to the sleeve 621 of the cylinder 603. Pressure is then applied at the top to the tappet 609, and the individual parts can simply be removed.

In FIG. 13, the pressing-on operation of the coil 617 and the cover housing 709 with the coil connector 627 is denoted symbolically by the arrow F6. For this purpose, a pressing ring 1301 is used as a tool for the pressing-on operation of the coil 617. In an exemplary embodiment (not shown), the coil connector 627 can also be arranged on the upper side of the coil 617.

FIG. 14 shows the mounted and finished inlet valve 601. The coil 617 is preferably mounted in a final assembly step. In this case, the coil 617 is oriented and pressed on the cylinder 603 and is then laterally calked once again at correspondingly suitable points.

Figure 15:
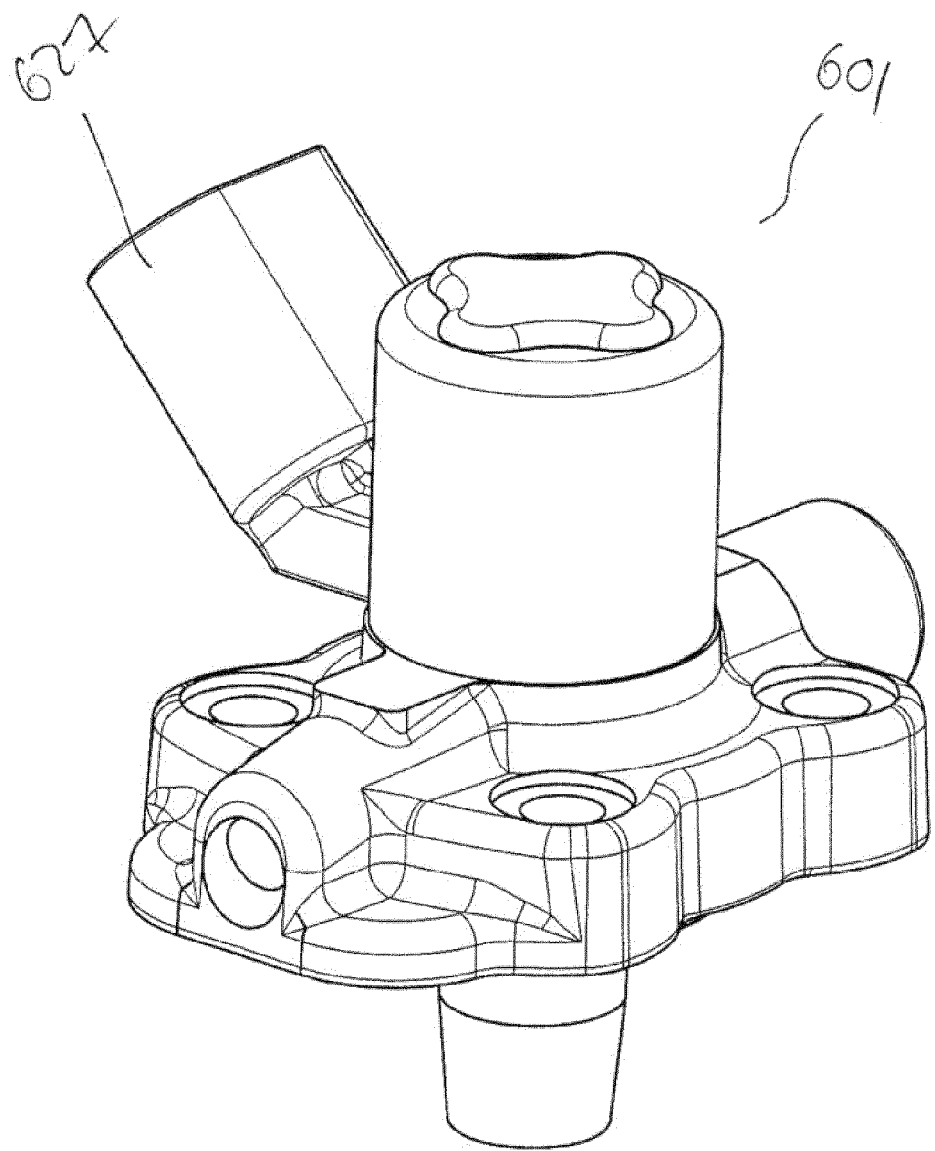
FIG. 15 shows a top view obliquely from above of the inlet valve from FIG. 14.
Figure 16:
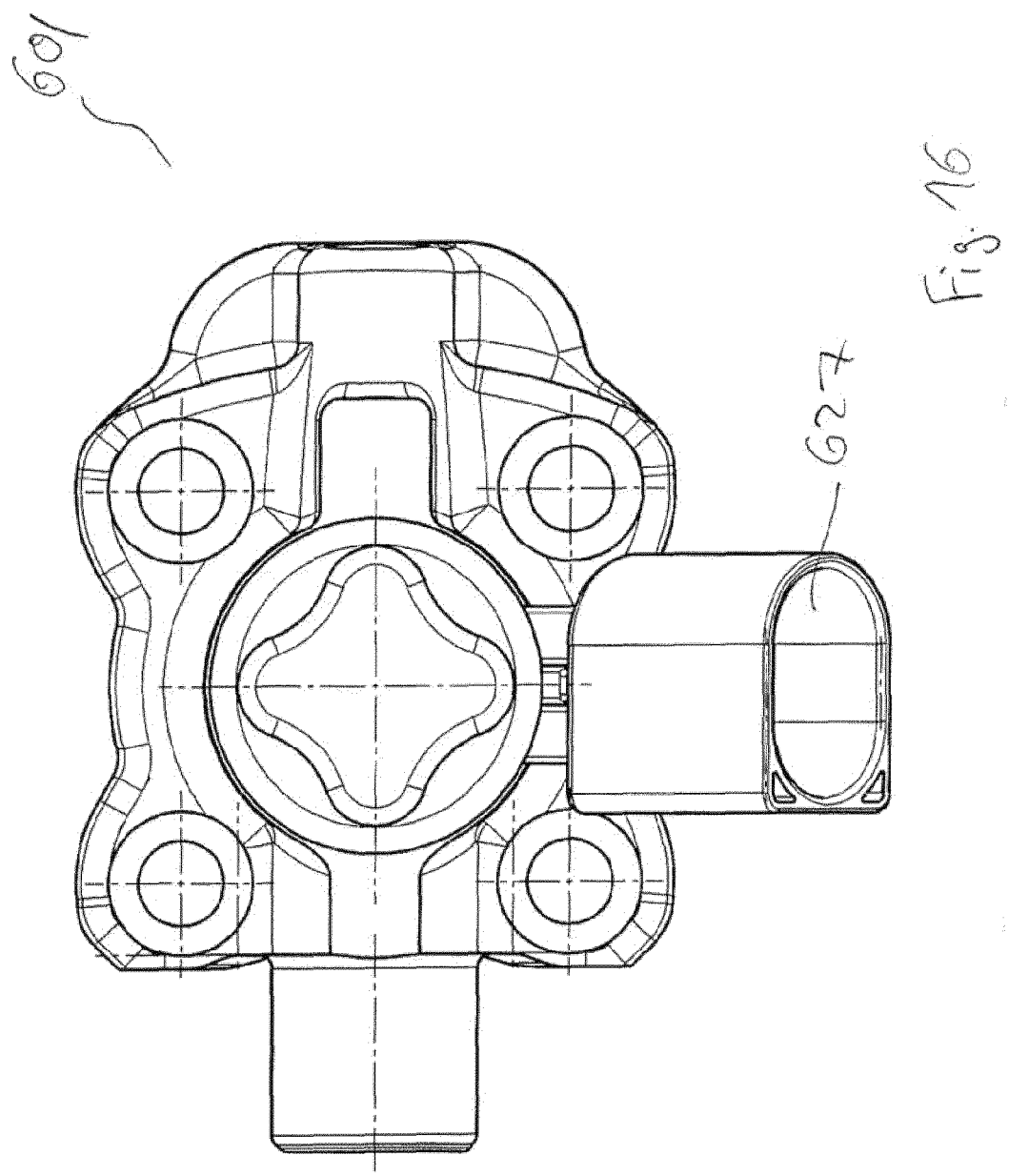
FIG. 16 shows a top view of the inlet valve shown in FIG. 14.

FIGS. 15 and 16 show different views of the inlet valve 601.

Figure 17:
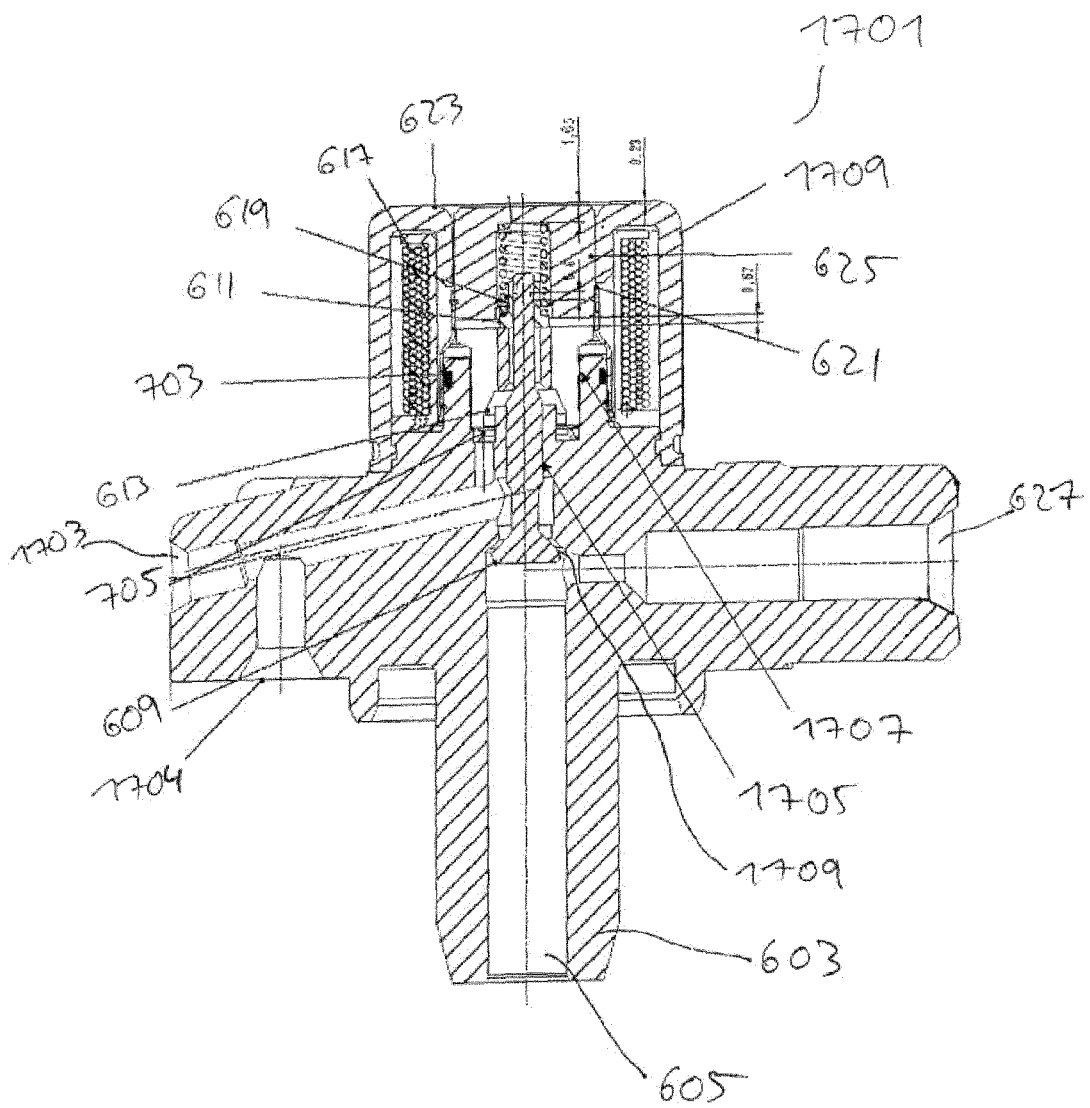
FIG. 17 shows a sectional view of an inlet valve for a fluid pump.

FIG. 17 shows a further inlet valve 1701 for a fluid pump (not shown). The further inlet valve 1701 has an opening 1703 which is closed by means of a king expander (not shown). Furthermore, the inlet valve 1701 comprises a fluid inlet opening 1704 which can be closed by means of the tappet 609. The tappet 609 is guided in a guide 1705 which is formed as a guide bore in the cylinder 603. The magnetic armature 613 is guided in a further guide 1707 which is formed as a further guide bore in the cylinder 603.

When the coil 617 is actuated, the armature 613 moves upward away from the piston 605 counter to the spring force of the spring 619. In the process, the magnetic armature 613 presses onto the bushing 611 which is fixedly connected to the tappet 609. When the coil 617 is actuated, the tappet 609 therefore moves as far as the stop thereof in a valve seat 1709 of the cylinder 603.

In the process, the tappet 609 is centered and guided in the guide bore 1709. The armature 613 is guided in the further guide bore 1707 of the cylinder 603.

The armature 613 presses onto the bushing 611 and can transmit virtually only exclusively axial forces to the tappet 609 in this respect. Radial forces, in particular radial magnetic forces, applied to the armature 613 are therefore not transmitted to the tappet 609, and therefore the tappet 609, which can generally also be referred to as a control pin, cannot be pressed out of the valve seat 1709, and this advantageously ensures tightness of the inlet valve 1701.

The dimensions shown in millimeters in FIG. 17 should also be understood here only as being by way of example and not as being limiting.

Figure 18:
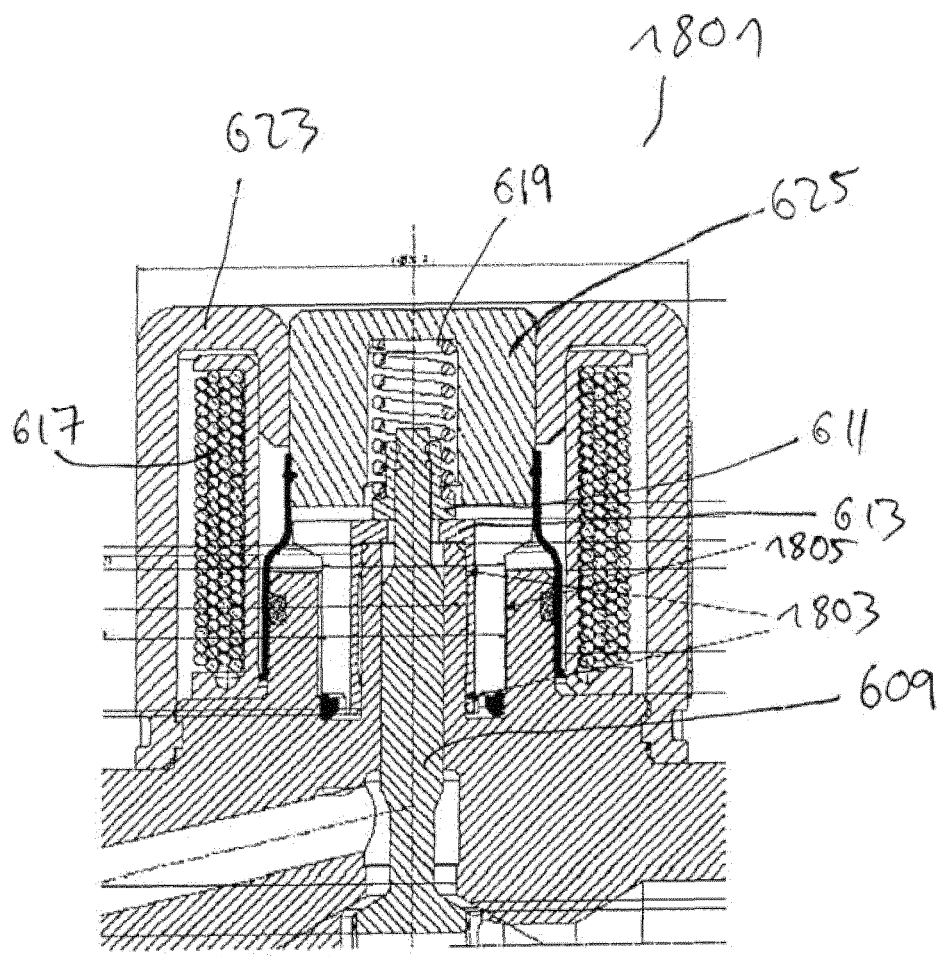
FIG. 18 shows a sectional view of a further inlet valve for a fluid pump.

FIG. 18 shows a further inlet valve 1801 for a fluid pump, wherein, in contrast to the inlet valve 1701 from FIG. 17, the armature 613 is guided on the inside diameter thereof. The guidance of the armature 613 at the inside diameter thereof is denoted by two arrows with the reference number 1803.

Better guidance of the armature 613 is thereby advantageously made possible. A corresponding play at the outside diameter of the armature 613 is denoted by the reference number 1805.

In an embodiment (not shown), the magnetic core is produced from a different material from the cylinder. In particular, a readily adhesive material is selected for the cylinder. In particular, a material having good magnetic properties and/or good welding properties is selected for the magnetic core.

Due to the radial decoupling between the armature and the tappet or control pin, the inlet valve is not subjected to high pressures; a high pressure is generally above 2000 bar in diesel applications. Said pressures generally act only on the tappet, wherein the latter is advantageously held and guided by the cylinder. In the case of corresponding screw valves, a larger area is subject to said pressure loading.

Furthermore, this advantageously makes it possible particularly simply to adjust a stroke and, in this respect, flow through the inlet valve. A net spring force is adjustable in particular by the displacement of the sleeve and therefore electric switching currents or the switching times can advantageously be adjusted "hydraulically".

Prior to the installation of the series coil, the inlet valve can advantageously be completely and simply removed without damaging the cylinder in the process. In particular, the inlet valve can be completely and simply removed before the sleeve is welded to the cylinder without the cylinder being damaged in the process. If the valve should be tested by the test coil and found not to be in order, the cylinder, which is generally expensive, since it has customarily been hardened and ground, can be reused without damage, which advantageously saves on material.

Due to the fact that the armature and the tappet are decoupled from each other, that is to say armature and tappet are not fixedly connected, transverse forces on the armature and an oblique position of the armature cannot negatively influence good sealing between the tappet and the cylinder or valve seat. The tappet is guided here in the cylinder. Seat and guide can advantageously be produced in a common machining step and this in particular minimizes leakage.

What is claimed is:

1. An inlet valve for a fluid pump, comprising:
   a tappet mounted to slide within a cylinder along a central axis of the cylinder to a closed position and to thereby close a fluid inlet opening, the tappet having an upper portion extending beyond the cylinder when the tappet is in the closed position,
   an actuator configured to move the tappet, the actuator comprising an armature disposed within the cylinder, and
   a bushing fixedly connected to the upper portion of the tappet, wherein the bushing remains completely outside the cylinder throughout the movement of the tappet,
   wherein the actuator and the tappet are held together by a spring force along the central axis but free to move separately from each other and the bushing acts as a coupling element that transmits an actuator driving force to the tappet only along the central axis.

2. The inlet valve of claim 1, wherein the coupling element decouples an actuator force acting transverse to a longitudinal axis of the tappet from the tappet.

3. The inlet valve of claim 1, wherein the cylinder has a guide bore for guiding the actuator.

4. The inlet valve of claim 1, comprising a spring configured to hold the tappet in an open position.

5. The inlet valve of claim 1, wherein the actuator has a magnetic armature configured to transmit an actuator driving force to the coupling element.

6. A common rail injection system of an engine, comprising:
   a low-pressure connection,
   a high-pressure connection, and
   inlet valve configured to control a volume of fuel between the low-pressure connection and the high-pressure connection, the inlet valve comprising:
   a tappet mounted to slide within a cylinder along a central axis of the cylinder to a closed position and to thereby close a fluid inlet opening, the tappet having an upper portion extending beyond the cylinder when the tappet is in the closed position,
   a bushing fixedly connected to the upper portion of the tappet, the bushing remaining completely outside the cylinder throughout movement of the tappet, and
   an actuator configured to move the tappet, the actuator comprising an armature disposed within the cylinder,
   wherein the actuator and the tappet are held together by a spring force along the central axis but free to move separately from each other and the bushing acts as a coupling element that transmits an actuator driving force to the tappet only along the central axis.

7. The common rail injection system of claim 6, wherein the coupling element decouples an actuator force acting transverse to a longitudinal axis of the tappet from the tappet.

8. The common rail injection system of claim 6, wherein the cylinder has a guide bore for guiding the actuator.

9. The common rail injection system of claim 6, comprising a spring configured to hold the tappet in an open position.

10. The common rail injection system of claim 6, wherein the actuator has a magnetic armature configured to transmit an actuator driving force to the coupling element.

11. An assembly method for an inlet valve for a fluid pump, the method comprising:
    forming a tappet,
    fixedly connecting a bushing to an upper portion of the tappet,
    mounting the tappet to slide within a cylinder along a central axis of the cylinder to a closed position and to thereby close a fluid inlet opening, with the bushing remaining outside of the cylinder throughout movement of the tappet to and from the closed position,
    forming an actuator separately from the tappet, the actuator configured to move the tappet, the actuator comprising an armature disposed within the cylinder, and
    coupling the actuator and the tappet to each other by a spring force along the central axis through the bushing so the actuator and the tappet may move freely from one another and arranged to transmit an actuator driving force from the actuator to the tappet only along the central axis.

12. The assembly method of claim 11, wherein an element used to couple the actuator and the tappet decouples an actuator force acting transverse to a longitudinal axis of the tappet from the tappet.

13. The assembly method of claim 11, wherein the cylinder has a guide bore for guiding the actuator.

* * * * *